United States Patent
Llach et al.

(10) Patent No.: US 9,117,261 B2
(45) Date of Patent: Aug. 25, 2015

(54) FILM GRAIN SEI MESSAGE INSERTION FOR BIT-ACCURATE SIMULATION IN A VIDEO SYSTEM

(75) Inventors: Joan Llach, Princeton, NJ (US); Cristina Gomila, Princeton, NJ (US); Jeffrey Allen Cooper, Rocky Hill, NJ (US); Jill MacDonald Boyce, Manalapan, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 2457 days.

(21) Appl. No.: 11/667,816

(22) PCT Filed: Nov. 8, 2005

(86) PCT No.: PCT/US2005/040383
§ 371 (c)(1),
(2), (4) Date: May 15, 2007

(87) PCT Pub. No.: WO2006/055333
PCT Pub. Date: May 26, 2006

(65) Prior Publication Data
US 2008/0192817 A1 Aug. 14, 2008

Related U.S. Application Data

(60) Provisional application No. 60/628,477, filed on Nov. 16, 2004.

(51) Int. Cl.
*H04N 7/12* (2006.01)
*G06T 5/00* (2006.01)
(Continued)

(52) U.S. Cl.
CPC ............. *G06T 5/002* (2013.01); *H04N 19/117* (2014.11); *H04N 19/159* (2014.11); *H04N 19/46* (2014.11); *H04N 19/85* (2014.11); *G06T 2207/10016* (2013.01); *G06T 2207/20204* (2013.01)

(58) Field of Classification Search
CPC ....................................................... H04N 7/12
USPC ............... 375/240.1–240.13, E7.088–E7.09, 375/E7.148, E7.17, E7.19, 240.12–240.14, 375/227, 254, E7.208, E7.191
See application file for complete search history.

(56) References Cited

U.S. PATENT DOCUMENTS 4,897,775 A  1/1990  Klaassens
4,935,816 A  6/1990  Faber
(Continued)

FOREIGN PATENT DOCUMENTS

CN  1530252  9/2004
EP  0622000  10/1992
(Continued)

OTHER PUBLICATIONS

Al-Shaykh, "Lossy Compression of Noisy Images," IEEE Transactions on Image Processing. vol. 7, No. 12, Dec. 1998.
(Continued)

*Primary Examiner* — Josnel Jeudy
(74) *Attorney, Agent, or Firm* — Robert D. Shedd; Robert B. Levy

(57) ABSTRACT

There are provided methods and apparatus for film grain SEI message insertion for bit-accurate simulation in a video system. A method for simulating film grain in an ordered sequence includes the steps of providing film grain supplemental information corresponding to a plurality of intra coded pictures, and providing additional film grain supplemental information corresponding to inter coded pictures between consecutive intra coded pictures, in decode order. The inter coded pictures are selected based upon display order.

22 Claims, 4 Drawing Sheets

(51) Int. Cl.
*H04N 19/159* (2014.01)
*H04N 19/46* (2014.01)
*H04N 19/117* (2014.01)
*H04N 19/85* (2014.01)

(56) References Cited

U.S. PATENT DOCUMENTS

| | | | |
|---|---|---|---|
| 4,998,167 A | 3/1991 | Jaqua | |
| 5,028,280 A | 7/1991 | Ihara et al. | |
| 5,140,414 A | 8/1992 | Mowry | |
| 5,216,556 A | 6/1993 | Steinberg et al. | |
| 5,262,248 A | 11/1993 | Ihara et al. | |
| 5,285,402 A | 2/1994 | Keith | |
| 5,285,482 A | 2/1994 | Sehier et al. | |
| 5,335,013 A | 8/1994 | Faber | |
| 5,374,954 A | 12/1994 | Mowry | |
| 5,386,244 A | 1/1995 | Gai | |
| 5,406,326 A | 4/1995 | Mowry | |
| 5,453,840 A | 9/1995 | Parker et al. | |
| 5,457,491 A | 10/1995 | Mowry | |
| 5,461,596 A | 10/1995 | Barrett | |
| 5,471,572 A | 11/1995 | Buchner et al. | |
| 5,475,425 A | 12/1995 | Przyborski et al. | |
| 5,550,815 A | 8/1996 | Cloonan et al. | |
| 5,629,769 A | 5/1997 | Cookingham et al. | |
| 5,641,596 A | 6/1997 | Gray et al. | |
| 5,659,382 A | 8/1997 | Rybczynski | |
| 5,687,011 A | 11/1997 | Mowry | |
| 5,706,361 A | 1/1998 | Kent et al. | |
| 5,709,972 A | 1/1998 | Cookingham et al. | |
| 5,715,008 A | 2/1998 | Sekiguchi et al. | |
| 5,742,892 A | 4/1998 | Chaddha | |
| 5,767,860 A | 6/1998 | Zimmer et al. | |
| 5,805,782 A | 9/1998 | Foran | |
| 5,817,447 A | 10/1998 | Yip | |
| 5,831,673 A | 11/1998 | Przyborski et al. | |
| 5,832,172 A * | 11/1998 | Jeon | 386/326 |
| 5,917,609 A | 6/1999 | Breeuwer et al. | |
| 6,067,125 A | 5/2000 | May | |
| 6,134,200 A | 10/2000 | Timmermans | |
| 6,216,838 B1 | 4/2001 | Bacher | |
| 6,219,838 B1 | 4/2001 | Cherichetti et al. | |
| 6,233,647 B1 | 5/2001 | Bentz et al. | |
| 6,269,180 B1 | 7/2001 | Sevigny | |
| 6,285,711 B1 | 9/2001 | Ratakonda et al. | |
| 6,327,391 B1 | 12/2001 | Ohnishi et al. | |
| 6,370,192 B1 | 4/2002 | Pearlstein et al. | |
| 6,373,992 B1 | 4/2002 | Nagao | |
| 6,441,918 B1 | 8/2002 | Hori | |
| 6,459,699 B1 | 10/2002 | Kimura et al. | |
| 6,496,221 B1 | 12/2002 | Wolf et al. | |
| 6,559,849 B1 | 5/2003 | Anderson et al. | |
| 6,597,509 B2 | 7/2003 | Suzuki et al. | |
| 6,650,327 B1 | 11/2003 | Airey et al. | |
| 6,665,369 B2 | 12/2003 | Ukita | |
| 6,667,815 B1 | 12/2003 | Nagao | |
| 6,724,942 B1 | 4/2004 | Arai | |
| 6,728,317 B1 | 4/2004 | Demos | |
| 6,744,928 B1 | 6/2004 | Juri et al. | |
| 6,839,152 B2 | 1/2005 | Fan et al. | |
| 6,868,190 B1 | 3/2005 | Morton | |
| 6,990,251 B2 | 1/2006 | Edgar | |
| 6,990,252 B2 | 1/2006 | Shekter | |
| 6,995,793 B1 | 2/2006 | Albadawi et al. | |
| 7,065,255 B2 | 6/2006 | Chen et al. | |
| 7,092,016 B2 | 8/2006 | Morton et al. | |
| 7,106,907 B2 | 9/2006 | Lin et al. | |
| 7,245,783 B2 | 7/2007 | Fielding | |
| 7,288,565 B2 | 10/2007 | Carr | |
| 7,362,911 B1 | 4/2008 | Frank | |
| 7,596,239 B2 | 9/2009 | Winger et al. | |
| 7,630,006 B2 | 12/2009 | Takei | |
| 7,653,132 B2 | 1/2010 | Dang | |
| 7,664,337 B2 | 2/2010 | Balram et al. | |
| 7,680,356 B2 | 3/2010 | Boyce et al. | |
| 7,738,722 B2 | 6/2010 | Gomila et al. | |
| 7,742,655 B2 | 6/2010 | Gomila et al. | |
| 7,856,055 B2 | 12/2010 | Zhou et al. | |
| 7,956,532 B2 | 6/2011 | Paul et al. | |
| 2001/0056568 A1 | 12/2001 | Hirotsu et al. | |
| 2002/0003903 A1 | 1/2002 | Engeldrum et al. | |
| 2002/0016103 A1 | 2/2002 | Behnke | |
| 2002/0034337 A1 | 3/2002 | Shekter | |
| 2002/0133764 A1 | 9/2002 | Wang | |
| 2002/0154140 A1 | 10/2002 | Tazaki | |
| 2002/0163657 A1 | 11/2002 | Bogdanowicz | |
| 2003/0011615 A1 * | 1/2003 | Tidwell | 345/600 |
| 2003/0031128 A1 | 2/2003 | Kim et al. | |
| 2003/0063778 A1 | 4/2003 | Rowe et al. | |
| 2003/0068097 A1 | 4/2003 | Wilson et al. | |
| 2003/0086623 A1 | 5/2003 | Berkner et al. | |
| 2003/0101453 A1 | 5/2003 | Matsuyama | |
| 2003/0206231 A1 | 11/2003 | Chen et al. | |
| 2003/0206662 A1 | 11/2003 | Sridhar et al. | |
| 2003/0218610 A1 | 11/2003 | Mech et al. | |
| 2004/0000065 A1 | 1/2004 | Visharam | |
| 2004/0013308 A1 * | 1/2004 | Jeon et al. | 382/236 |
| 2004/0073926 A1 | 4/2004 | Nakamura et al. | |
| 2004/0101059 A1 | 5/2004 | Joch et al. | |
| 2006/0013320 A1 | 1/2006 | Oguz et al. | |
| 2006/0072660 A1 * | 4/2006 | Jia et al. | 375/240.03 |
| 2006/0083426 A1 | 4/2006 | Cooper et al. | |
| 2006/0083429 A1 | 4/2006 | Joly | |
| 2006/0104366 A1 | 5/2006 | Huang et al. | |
| 2006/0183275 A1 | 8/2006 | Schoner | |
| 2006/0256853 A1 | 11/2006 | Schlockermann | |
| 2006/0291557 A1 | 12/2006 | Tourapis | |
| 2007/0002947 A1 * | 1/2007 | Lu et al. | 375/240.12 |
| 2007/0030996 A1 | 2/2007 | Winger et al. | |
| 2007/0036452 A1 | 2/2007 | Llach et al. | |
| 2007/0058878 A1 | 3/2007 | Gomila et al. | |
| 2007/0140588 A1 | 6/2007 | Balram et al. | |
| 2008/0252781 A1 | 10/2008 | De Waele et al. | |
| 2010/0104025 A1 | 4/2010 | Rose et al. | |

FOREIGN PATENT DOCUMENTS

| | | |
|---|---|---|
| EP | 1175091 | 1/2002 |
| EP | 1215624 | 6/2002 |
| JP | 1156069 | 6/1989 |
| JP | 3187661 | 8/1991 |
| JP | 4097681 | 3/1992 |
| JP | 5252459 | 9/1993 |
| JP | 9062718 | 9/1993 |
| JP | 9139940 | 5/1997 |
| JP | 9247681 | 9/1997 |
| JP | 10509297 | 9/1998 |
| JP | 11250246 | 9/1999 |
| JP | 200041242 | 8/2000 |
| JP | 2001357090 | 12/2001 |
| JP | 2001357095 | 12/2001 |
| JP | 2002057719 | 2/2002 |
| JP | 2002344514 | 11/2002 |
| JP | 2002374541 | 12/2002 |
| JP | 2003163853 | 6/2003 |
| JP | 2003179923 | 6/2003 |
| JP | 2004120057 | 4/2004 |
| JP | 2005080301 | 3/2005 |
| JP | 2007507172 | 3/2007 |
| JP | 2007521573 | 8/2007 |
| JP | 2007529945 | 10/2007 |
| RU | 2073913 | 9/1991 |
| RU | 2088962 | 8/1997 |
| RU | 2139637 | 10/1999 |
| WO | WO9314591 | 7/1993 |
| WO | WO9520292 | 7/1995 |
| WO | WO9710676 | 3/1997 |
| WO | WO9722204 | 6/1997 |
| WO | WO9841026 | 9/1998 |
| WO | WO0146992 | 6/2001 |

(56) References Cited

FOREIGN PATENT DOCUMENTS

| WO | WO0177871 | 10/2001 |
|---|---|---|
| WO | WO2004104931 | 12/2004 |
| WO | WO2005039188 | 4/2005 |

OTHER PUBLICATIONS

Gomila, "SEI Message for Film Grain Encoding," XP-002308742, Joint Video Team (JVT) of ISO/IEC MPEG & ITU-T VCEG, Document: JVT-H022, 8th Meeting, May 23-27, 2003, Geneva, CH.

Al-Shaykh et al, "Lossy Compression of Images Corrupted by Film Grain Noise," School of Electrical and Computer Engineering, 1996 IEEE.

Al-Shaykh et al, "Restoration of Lossy Compressed Noisey Images," IEEE Transactions on Image Processing, vol. 8, No. 10, Oct. 1999.

Al-Shaykk "Lossy Compression of Noisy Images," IEEE Transactions on Image Processing. vol. 7, No. 12, Dec. 1998.

Brightwell et al, "Automated Correction of Film Unsteadiness, Dirt and Grain," International Broadcasting Convention, Sep. 16-20, 1994, Conference Publication No. 397, IEE, 1994.

Campisi et al, "Signal-Dependent Film Grain Noise Generation Using Homomorphic Adaptive Filtering," IEE Proceedings, Image Signal Process, vol. 147, No. 3, Jun. 2000.

Chao et al, "Constant Quality Rate Control for Streaming MPEG-4 Fgs. Video," Integrated Media Systems Center and Department of Electrical Engineering, University of Southern California, 2000 IEEE.

Chavel et al, "Film Grain Noise in Partially Coherent Imaging," Optical Engineering, vol. 19, No. 3, May-Jun. 1980.

Fischer et al, "Image Sharpening Using Permutation Weighted Medians," Department of Electrical Engineering, University of Delaware, fischer@ee.udel.edu, paredesj@ee.udel.edu, arce@ee.udel.edu.

Gomila, "SEI Message for Film Grain Encoding," XP-002308742, Joint Video Team (JVT) of ISO/IEC MPEG & ITU-T VCEG, Document JVT-H022, 8th Meeting, May 23-27, 2003, Geneva, CH.

Gomila, "SEI Message for Film Grain Encoding: Syntax and Results," XP-002308743, Joint Video Team (JVT) of ISO/IEC MPEG & ITU-T VCEG, Document: JVT-1013r2, 7th Meeting, Sep. 2-5, 2003, San Diego, CA.

Illingworth et al, "Vision, Image and Signal Processing," The Institution of Electrical Engineers, IEE Proceedings, Jun. 2000, vol. 147, No. 3.

McLean et al, "Telecine Noise Reduction," XP-002285972, 2001 The Institute of Electrical Engineers.

Oktem et al, "Transform Domain Algorithm for Reducing Effect of Film-Grain Noise in Image Compression," Electronics Letters, Oct. 14, 1999, vol. 35, No. 21.

Peng et al, "Adaptive Frequency Weighting for Fine-Granularity-Scalability," Visual Communications and Image Processing 2002, Proceedings of SPIE, vol. 4671, 2002 SPIE 0277-786X/02.

Prades-Nebot et al, "Rate Control for Fully Fine-Grained Scalable Video Coders," Visual Communications and Image Processing 2002, Proceedings of SPIE, vol. 4671 (2002), SPIE 0277-786X/02.

Schaar et al, "Fine-Granularity-Scalability for Wireless Video and Scalable Storage," Visual Communications and Image Processing 2002, Proceedings of SPIE, vol. 4671 (2002) SPIE 0277-786X/02.

Shahnaz et al, "Image Compression in Signal-Dependent Noise," Applied Optics, vol. 38, No. 26, Sep. 10, 1999.

Yan et al, "Efficient Video Coding with Hybrid Spatial and Fine-Grain SNR Scalabilities," Department of Electronic Engineering, Beijing Institute of Technology, China.

Yan et al, "Film Grain Noise Removal and Generation for Color Images," Department Electrical and Computer Engineers, University of Toronto, dimitris@comm.toronto.edu.

Yan et al, "Signal-Dependent Film Grain Noise Removal and Generation Based on Higher-Order Statistics," University of Toronto, Department of Electrical and Computer Engineering, dimitris@comm.toronto.edu, 1997 IEEE.

Yoshida, "Go with the Grain, Film R&D Chief Urges, for Art's Sake," EE Times, Feb. 7, 2005.

Zhang et al, "Constant Quality Constrained Rate Allocation for FGS Video Coded Bitstreams," Visual Communications and Image Processing 2002, Proceedings of SPIE, vol. 4671 (2002) SPIE 0277-786X/02.

International Search Report dated Mar. 21, 2006.

Office Action for U.S. Appl. No. 10/556,834 mailed Aug. 19, 2008.

Office Action for U.S. Appl. No. 10/556,834 mailed Feb. 20, 2009.

Notice of Non-Compliant Amendment for U.S. Appl. No. 10/556,834 mailed Jun. 16, 2009.

Office Action for U.S. Appl. No. 10/569,318 mailed Aug. 15, 2008.

Office Action for U.S. Appl. No. 10/569,318 mailed Feb. 13, 2009.

Office Action for U.S. Appl. No. 10/569,318 mailed Jul. 31, 2009.

Office Action for U.S. Appl. No. 10/572,820 mailed Jun. 1, 2009.

Office Action for U.S. Appl. No. 10/571,148 mailed Apr. 15, 2009.

Office Action for U.S. Appl. No. 10/575,676 mailed Dec. 15, 2008.

Office Action for U.S. Appl. No. 10/575,676 mailed Mar. 13, 2009.

Office Action for U.S. Appl. No. 11/246,848 mailed Jun. 26, 2009.

Office Action for U.S. Appl. No. 11/252,177 mailed May 29, 2008.

Office Action for U.S. Appl. No. 11/252,177 mailed Nov. 5, 2008.

Office Action for U.S. Appl. No. 11/252,177 mailed Apr. 17, 2009.

Office Action for U.S. Appl. No. 11/252,177 mailed Sep. 18, 2009.

Bjontegaard_"Addition_of_comfort_noise_as_post_processing": ITU Telecommunications Standarization Sector, Sunriver, Oregon, Sep. 8, 1997. pp. 102.

Byun_EtAl_"Power_effcient_MPEG4_decoder_architecture_featuring_low_complexity_error_resilience".: IEE Asia Pacific Conference on ASIC, Taipei, Taiwan, Aug. 6, 2002.

Conklin_EtAl_"Dithering_5Tap_Filter_for_Inloop_Deblocking": Joint Video Team (JVT OF ISO/IEC MPEG & ITU-T VCEG, Fairfax, Virginia May 6, 2002.

Lerner_"Fixed_vs._floating_point: A_surprisingly_hard_choice". eetimes, Feb. 6, 2007. pp. 1-4.

McMahon_EtAl_"High_Quality_Sd_and_HD_AVC_Test_Results". Joint Video Team (JVT OF ISO/IEC MPEG & ITU-T VCEG) Geneva, Switzerland. Oct. 9, 2002.

Naderi_EtAl_"Estimation_of_images_degraded_by_film_grain_noise". Pulixhed by Applied Optics, vol. 17, Issue 8, pp. 1228-1237. Abstract only available. 1978.

Pirsch_EtAl_"VSLI_Architectures_for_Video_Compression". Conference Paper. IEEE Conference on Signals, Systems and Electronics. Oct. 25, 19957.

Schlockerman_EtAl: "Film_Grain_coding_in_H.264/AVC"; JVT (JVT OF ISO/IEC MPEG & ITU-T VCEG); 9th Meeting, San Diego, California, Sep. 2, 2003.

Wiegand_EtAl_"Overview_of_the_H.264/AVC_Video_Coding_Standard" IEEE Transactions on Circuits and Systems for Video Technology, vol. 13, No. 7. Jul. 2003.

Sullivan_EtAl_"The_H.264/AVC_advanced_video_coding_standard:_Overview_and_Introduction_to_the_Fidelity_Range_Extensions" . Proceedings of SPIE 5558 App of Digital Image Processing XXVII, Nov. 2, 2014.

Malaysian Search Report dated Oct. 29, 2009.

\* cited by examiner

FILM GRAIN SEI MESSAGE INSERTION FOR BIT-ACCURATE SIMULATION IN A VIDEO SYSTEM

CROSS-REFERENCE TO RELATED APPLICATIONS

This application claims the benefit, under 35 U.S.C. §365 of International Application PCT/US2005/040383, filed Nov. 8, 2005, which was published in accordance with PCT Article 21(2) on May 26, 2006 in English and claims priority of 60/628,477 filed Nov. 16, 2004.

FIELD OF THE INVENTION

The present invention relates generally to video encoders and video decoders and, more particularly, to film grain Supplemental Enhancement Information (SEI) message insertion for bit-accurate film grain simulation in a video system.

BACKGROUND OF THE INVENTION

Film Grain Management (FGM, also referred to as Film Grain Technology, or FGT) has been presented as a new tool that allows encoding the grain in motion picture film by means of a parameterized model to be transmitted as parallel information for use by a video decoder. To support FGM, the Fidelity Range Extension (FRExt) Amendment to the ITU-T Rec. H.264|ISO/IEC 14496-10|MPEG-4 AVC|Joint Video Team (JVT) standard (hereinafter the "H.264 standard") has defined a Film Grain Supplemental Enhancement Information (SEI) message. The SEI message describes the film grain characteristics regarding attributes such as size and intensity, and allows a video decoder to simulate the film grain look onto the decoded picture. The H.264 standard specifies which parameters are present in the film grain SEI message, how to interpret the parameters, and the syntax for encoding the SEI message in binary format. However, the H.264 standard does not specify the exact procedure to simulate film grain upon reception of the film grain SEI message by a video decoder. It is to be appreciated that FGM can be used jointly with any other video coding method, since FGM utilizes parallel information, transmitted from an encoder, that does not affect the decoding process.

In FGM, the encoder models the film grain of the video sequence and the decoder simulates the film grain according to the received information. The encoder can use FGM to enhance the quality of the compressed video when there is difficulty retaining the film grain. Additionally, the encoder has the option of removing or attenuating the film grain prior to encoding in order to reduce the bit-rate.

Film grain simulation aims at synthesizing film grain samples that simulate the look of original film content. Unlike film grain modeling, which is entirely performed at the encoder, film grain simulation is performed at the decoder. Film grain simulation is done after decoding the video stream and prior to display. Images with added film grain are never used within the decoding process. Being a post-processing method, synthesis of simulated film grain on the decoded images for the display process is not specified in the H.264 standard. The film grain simulation process includes the decoding of film grain supplemental information, transmitted in a film grain SEI message as specified by the Fidelity Range Extensions Amendment of the H.264 standard mentioned above.

In a previously disclosed prior art approach to film grain simulation, a set of specifications was disclosed to allow bit-accurate film grain simulation during normal playback. In order to support bit-accuracy with trick mode play (e.g. fast forward, reverse playback, jump to chapters, and so forth) an addendum to this first prior art approach (the addendum hereinafter referred to as the second prior art approach) was developed. In the second prior art approach to film grain simulation, bit-accuracy was achieved by transmitting the film grain SEI messages only preceding I frames and forcing the transmitted film grain SEI messages to be applied in decoding order. The second prior art approach ensures consistent film grain simulation for all the frames in normal playback as well as in trick mode play, with a minimum overhead in the video bit-stream due to the transmission of the film grain SEI messages. However, since the H.264 standard specifies that SEI messages are to be applied in display order (versus decoding order as specified in the second prior art approach), the solution proposed in the second prior art approach is not compliant with the H.264 standard. While this fact does not affect the perceived visual quality, it may prevent the deployment of the specifications disclosed in the second prior art approach in those forums where conformance to the H.264 standard is required.

Turning to FIG. 1, a film grain simulation in normal playback is indicated generally by the reference numeral 100. In particular, FIG. 1 shows the differences between film grain simulation in decode order 110 according to the second prior art approach and film grain simulation in display order 120 according to the H.264 standard. In this example, film grain SEI messages are sent preceding each I picture. Bold typeface denotes a picture where a film grain SEI has been inserted. In FIG. 1, decode order, the film grain SEI message sent with picture I2 is used in all following pictures until picture B10 is reached (inclusive). Horizontal lines above (decode order) or below (display order) pictures denote the film grain parameters (FG n) used with the pictures; for example, in FIG. 1, display order, film grain parameters FG 1 are used from the first I2 picture until the second B1 picture (inclusive). If SEI messages are assumed to apply to all frames following an I picture in decoding order, as specified in the second prior art approach, the film grain SEI message sent in I2 will apply to frames B0 and B1. However, if SEI messages are assumed to apply to all frames following an I picture in display order, as specified in the H.264 standard, frames B0 and B1 will be affected by the film grain SEI message of the previous I picture.

Accordingly, it would be desirable and highly advantageous to have a method for inserting film grain SEI messages in a video system in bit-accurate manner and in compliance with the H.264 standard.

SUMMARY OF THE INVENTION

These and other drawbacks and disadvantages of the prior art are addressed by the present invention, which is directed to film grain characteristics Supplemental Enhancement Information (SEI) message insertion for bit-accurate simulation in a video system.

According to an aspect of the present invention, there is provided a method for simulating film grain in an ordered sequence. The method includes the steps of providing film grain supplemental information corresponding to a plurality of intra coded pictures, and providing additional film grain supplemental information corresponding to inter coded pictures between consecutive intra coded pictures, in decode order. The inter coded pictures are selected based upon display order.

According to another aspect of the present invention, there is provided a bit-accurate method for simulating film grain in display order to provide consistent film grain simulation irrespective of play mode. The method includes the step of sending film grain SEI messages preceding I, P and B pictures. Only one film grain SEI message precedes a particular one of the I, P, and B pictures. Moreover, the only one of the film grain SEI messages preceding a B picture is the same as the film grain SEI message of an I picture or a P picture preceding the B picture, in decoding order.

According to yet another aspect of the present invention, there is provided an apparatus for simulating film grain in an ordered sequence. The apparatus includes a film grain modeler for providing film grain supplemental information corresponding to a plurality of intra coded pictures, and for providing additional film grain supplemental information corresponding to inter coded pictures between consecutive intra coded pictures, in decode order. The inter coded pictures are selected based upon display order.

According to still yet another aspect of the present invention, there is provided a bit-accurate apparatus for simulating film grain in display order to provide consistent film grain simulation irrespective of play mode. The apparatus includes a film grain modeler for sending film grain SEI messages preceding I, P and B pictures. Only one film grain SEI message precedes a particular one of the I, P, and B pictures. Moreover, the only one of the film grain SEI messages preceding a B picture is the same as the film grain SEI message of an I picture or a P picture preceding the B picture, in decoding order.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which:

FIG. 4 is a diagram illustrating an example of film grain simulation in normal playback in accordance with the principles of the present invention;

FIG. 5 is a diagram illustrating an example of film grain simulation in trick mode play in accordance with the principles of the present invention;

FIG. 6 is a diagram illustrating an example of film grain simulation in 2× fast forward trick mode play in accordance with the principles of the present invention;

FIG. 9 is a diagram illustrating an example of film grain simulation in normal playback in accordance with the principles of the present invention.

DETAILED DESCRIPTION

Figure 1:
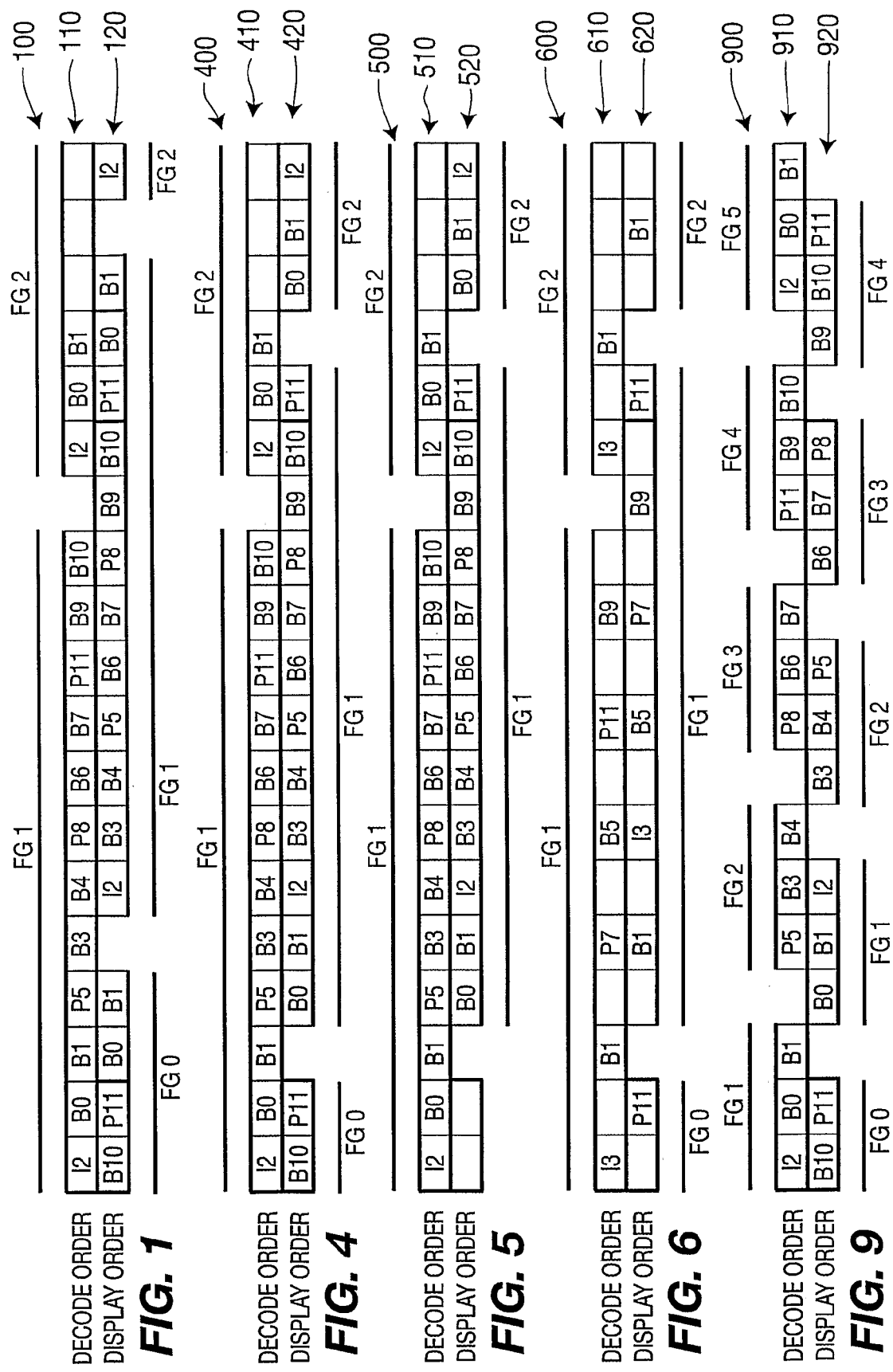
FIG. 1 is a diagram illustrating a film grain simulation in normal playback in accordance with the prior art.

The present invention is directed to film grain Supplemental Enhancement Information (SEI) message insertion for bit-accurate simulation in a video system.

Advantageously, the present invention allows a bit-accurate implementation of the film grain simulation process during normal play and trick-mode play that is in conformance with the H.264 standard. According to one illustrative embodiment of the present invention, film grain SEI messages should be transmitted not only preceding I pictures, as per the prior art, but also between two consecutive I pictures, in decoding order, preceding the P or B picture with the smallest picture order count (POC) value. Other inventive specifications in accordance with the present invention are also provided herein. It is to be appreciated that, given the teachings of the present invention provided herein, the present invention can be applied jointly with any other video coding standard having the capability of conveying a pre-specified set of film grain parameters, either in-band or out-of-band.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Figure 2:
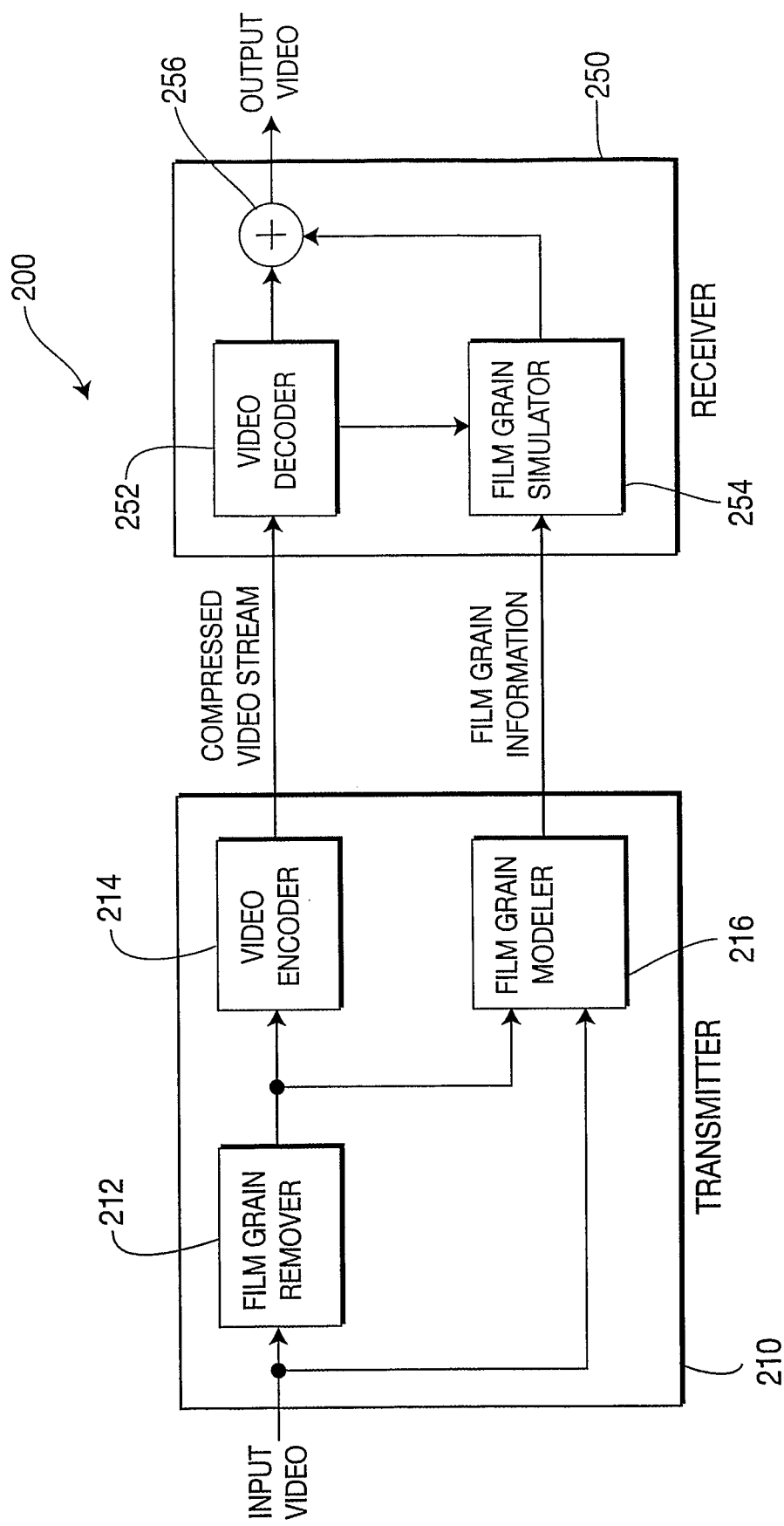
FIG. 2 is a block diagram illustrating a Film Grain Management (FGM) processing chain to which the present invention may be applied.

Turning to FIG. 2, a Film Grain Management (FGM) processing chain to which the present invention may be applied is indicated generally by the reference numeral 200. The FGM processing chain includes a transmitter 210 and a receiver 250. The transmitter includes a film grain remover 212, a video encoder 214, and a film grain modeler 216. The receiver includes a video decoder 252, a film grain simulator 254, and a combiner 256.

An input to the transmitter 210 is connected in signal communication with an input of the film grain remover 212 and a first input of the film grain modeler 216. An output of the film grain remover 212 is connected in signal communication with an input of the video encoder 214 and a second input of the film grain modeler 216. An output of the video encoder 214 is available as a first output of the transmitter 210. An output of the film grain modeler 216 is available as a second output of the transmitter 210. The first output of the transmitter 210 is connected in signal communication with a first input of the receiver 250. The second output of the transmitter 210 is connected in signal communication with a second input of the receiver 250. The first input of the receiver 250 is connected in signal communication with an input of the video decoder 252. The second input of the receiver 250 is connected in signal communication with a first input of the film grain simulator 254. A first output of the video decoder 252 is connected in signal communication with a second input of the film grain simulator 254. A second output of the video decoder 252 is connected in signal communication with a first input of the combiner 256. An output of the film grain simulator is connected in signal communication with a second input of the combiner 256. An output of the combiner 256 is available as an output of the receiver 250.

A description will now be given with respect to FIG. 3 regarding a first illustrative embodiment in accordance with the principles of the present invention relating to film grain Supplemental Enhancement Information (SEI) message insertion for bit-accurate simulation in a video system. The method of FIG. 3 extends the specifications described above with respect to the first and second prior art approaches relating to SEI message insertion, with additional specifications that provide both bit-accuracy and compliance with the H.264 standard.

Figure 3:
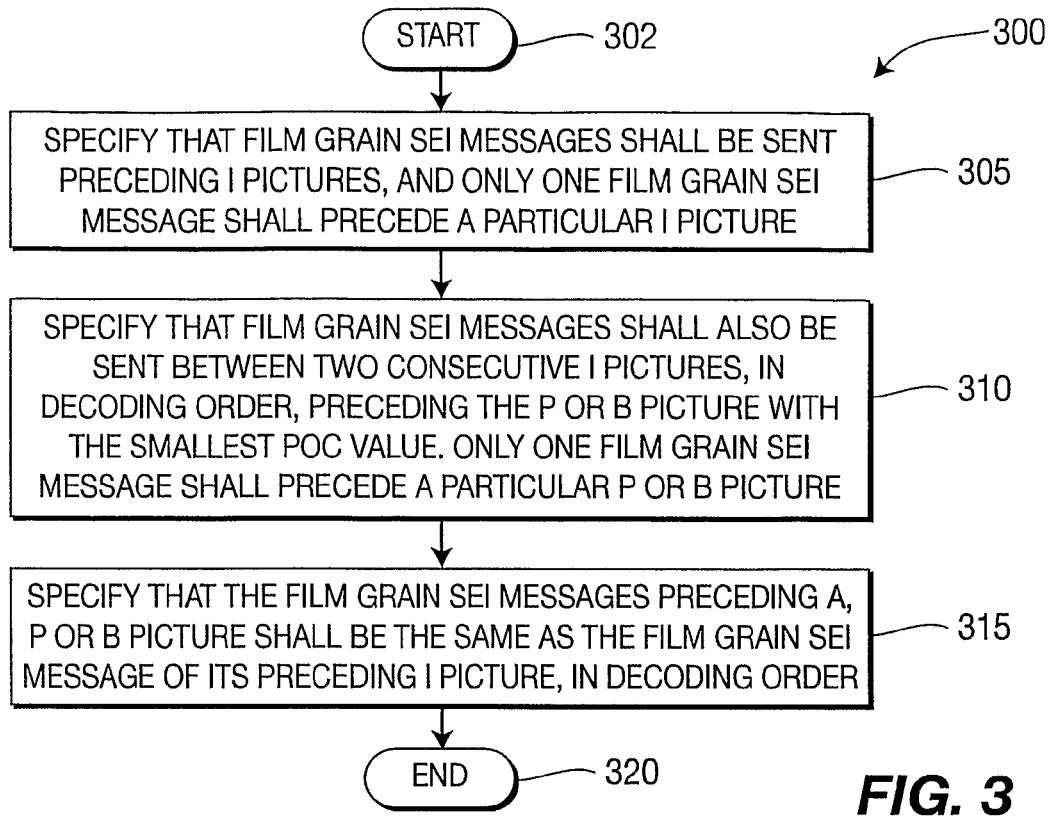
FIG. 3 is a flow diagram illustrating a method for film grain SEI message insertion for bit-accurate simulation in a video system in accordance with the principles of the present invention.

Turning to FIG. 3, a method for film grain SEI message insertion for bit-accurate simulation in a video system is indicated generally by the reference numeral 300. The method includes a start block 302 that passes control to a function block 305. The function block 305 specifies that film grain SEI messages shall be sent preceding I pictures, further specifies that only one film grain SEI message shall precede a particular I picture, and passes control to a function block 310. The function block 310 specifies that film grain SEI messages shall also be sent between two consecutive I pictures, in decoding order, preceding the P or B picture with the smallest POC value, further specifies that only one film grain SEI message shall precede a particular P or B picture, and passes control to a function block 315. The function block 315 specifies that the film grain SEI message preceding a P or B picture shall be the same as the film grain SEI message of the closest I picture that precedes the P or B picture, in decoding order, and passes control to an end block 320.

According to the specifications shown and described with respect to FIG. 3, film grain simulation can be performed with bit-accuracy in both display order and decode order. Furthermore, bit-accuracy is also achieved between normal playback and trick mode play.

Turning to FIG. 4, an example of film grain simulation in normal playback in accordance with the method 300 of FIG. 3 is indicated generally by the reference numeral 400. In particular, FIG. 4 shows the differences between film grain simulation in normal playback in decode order 410 and in display order 420, both in accordance with the principles of the present invention. In accordance with the method 300 of FIG. 3, a film grain SEI is inserted preceding the I2 picture (first in decode order) and preceding the B0 picture (first in display order). It is to be noted that B0 and B1 have the same film grain characteristics regardless of the film grain simulation order.

It is to be appreciated that the method 300 of FIG. 3 ensures bit-accuracy between film grain simulation in decoding order and display order, providing an implementation choice to hardware/software designers. The results obtained by the method 300 of FIG. 3 are compliant with the standard H.264. This is done with a minimum overhead in the coded videostream due to the insertion of film grain SEI messages. It is to be further appreciated that the method 300 of FIG. 3 ensures bit-accuracy between normal play as well as trick mode play.

Turning to FIG. 5, an example of film grain simulation in trick mode play in accordance with the method 300 of FIG. 3 is indicated generally by the reference numeral 500. In particular, FIG. 5 shows the differences between film grain simulation in trick mode play in decode order 510 and in display order 520, both in accordance with the principles of the present invention. Further, the example 500 relates to a jump to B0 in trick mode play that is accomplished with bit-accuracy given that a film grain SEI message has been inserted preceding the B0 picture.

A description will now be given with respect to FIG. 7 regarding a second illustrative embodiment in accordance with the principles of the present invention relating to film grain Supplemental Enhancement Information (SEI) message insertion for bit-accurate simulation in a video system.

Figure 7:
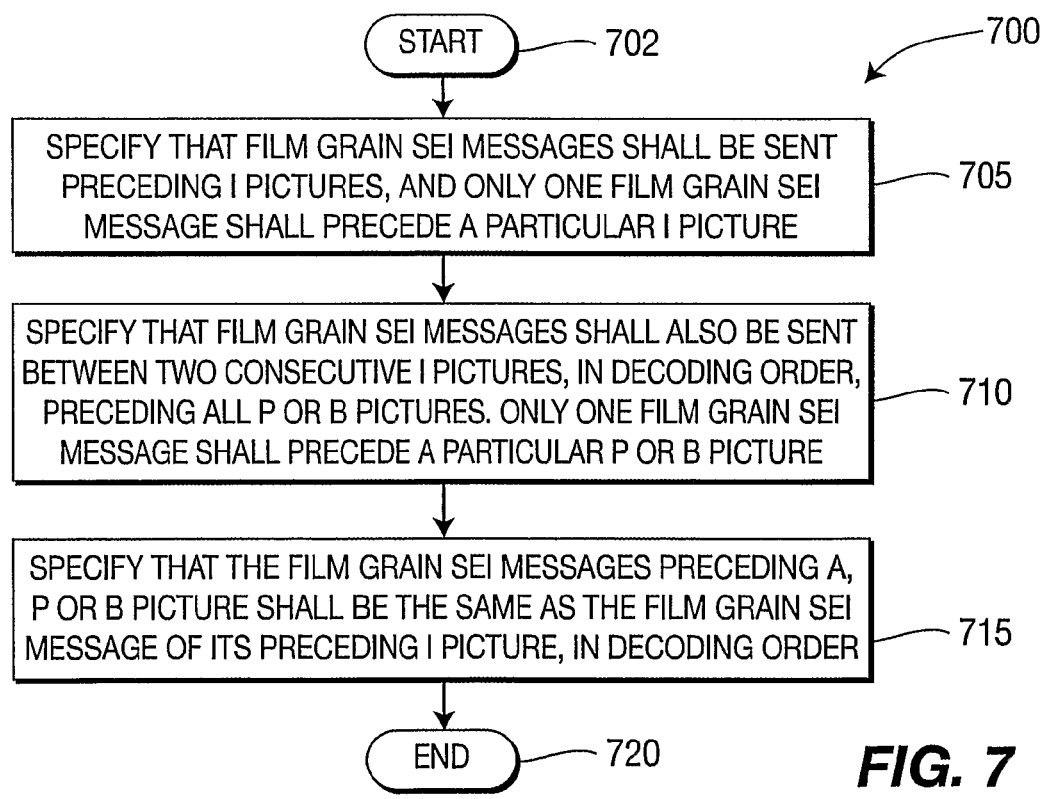
FIG. 7 is a flow diagram illustrating another method for film grain SEI message insertion for bit-accurate simulation in a video system in accordance with the principles of the present invention.

Turning to FIG. 7, a method for film grain SEI message insertion for bit-accurate simulation in a video system is indicated generally by the reference numeral 700. The method 700 of FIG. 7 is derived from the method 300 of FIG.

3 by forcing the insertion of the same film grain SEI in all P pictures and in all B pictures following and I or P picture between two consecutives I pictures.

The method 700 includes a start block 702 that passes control to a function block 705. The function block 705 specifies that film grain SEI messages shall be sent preceding I pictures, further specifies that only one film grain SEI message shall precede a particular I picture, and passes control to a function block 710. The function block 710 specifies that film grain SEI messages shall also be sent between two consecutive I pictures, in decoding order, preceding all P pictures or all B pictures following an I or P picture, further specifies that only one film grain SEI message shall precede a particular P or B picture, and passes control to a function block 715. The function block 715 specifies that the film grain SEI message preceding a P or B picture shall be the same as the film grain SEI message of the closest I picture preceding the P or B picture, in decoding order, and passes control to an end block 720.

It is to be appreciated that the method 700 of FIG. 7 increases the overhead due to the presence of the film grain SEI messages in the bit-stream. However, it facilitates the access to the SEI message in display order for trick mode play, as in the example 600 illustrated in FIG. 6. Turning to FIG. 6, an example of film grain simulation in 2× fast forward trick mode play in accordance with the method 700 of FIG. 7 is indicated generally by the reference numeral 600. In particular, FIG. 6 shows the differences between film grain simulation in 2× fast forward trick mode play in decode order 610 and in display order 620, both in accordance with the principles of the present invention. In the example 600 of FIG. 6, the decoder will not decode the film grain SEI message in B0. However, it is correct to assume that the film grain SEI message sent preceding the I2 picture applies to B1 since in the second prior art approach forces the SEI messages in I2 and B0 to be identical.

A description will now be given with respect to FIG. 8 regarding a third illustrative embodiment in accordance with the principles of the present invention relating to film grain Supplemental Enhancement Information (SEI) message insertion for bit-accurate simulation in a video system. In order to allow film grain variations between two consecutive I pictures, the method of FIG. 8 enlarges the set of specifications of the method 300 of FIG. 3 as follows.

Figure 8:
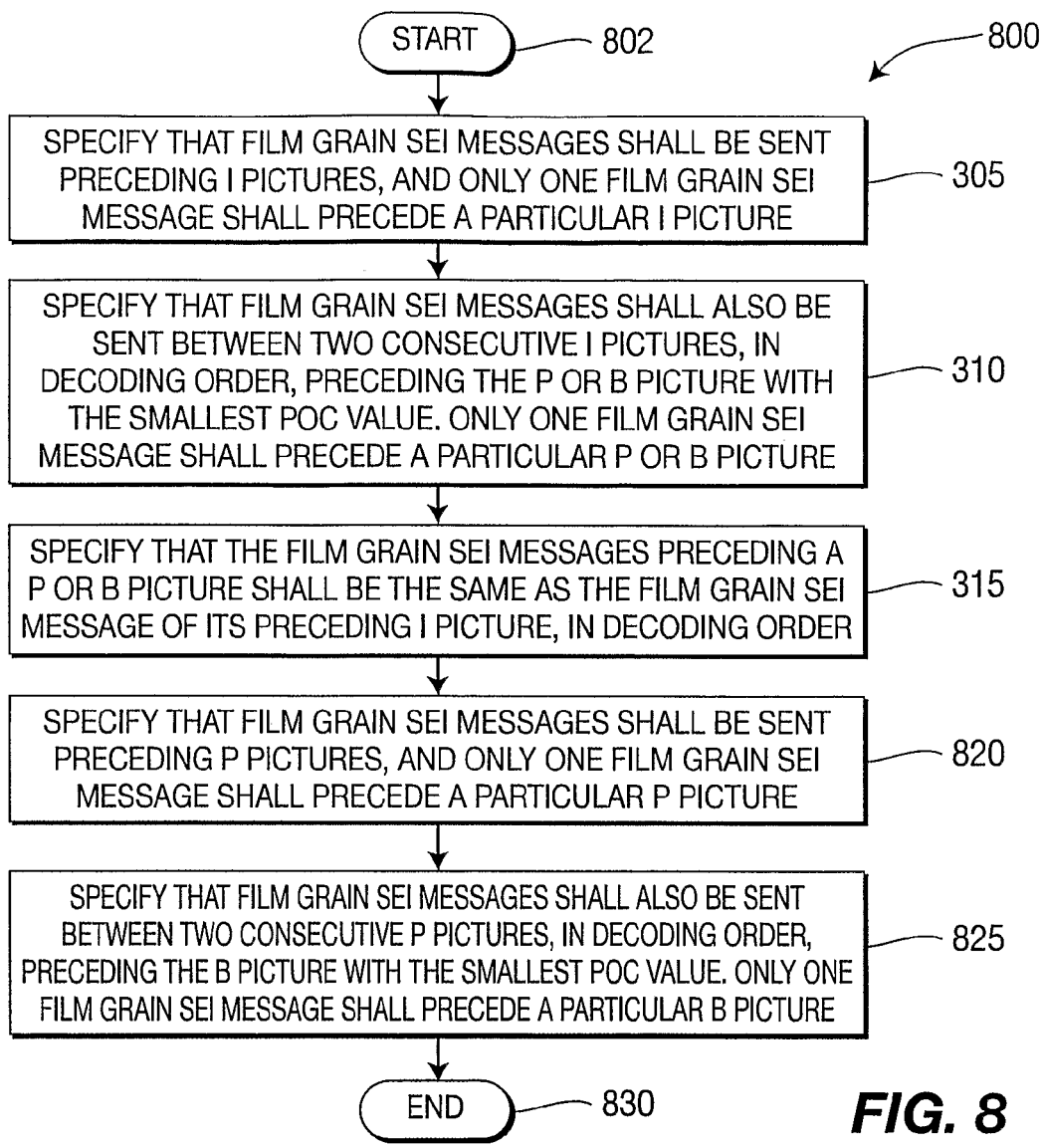
FIG. 8 is a flow diagram illustrating yet another method for film grain SEI message insertion for bit-accurate simulation in a video system in accordance with the principles of the present invention.

Turning to FIG. 8, a method for film grain SEI message insertion for bit-accurate simulation in a video system is indicated generally by the reference numeral 800. It is to be appreciated that the method 800 of FIG. 8 includes the function blocks of the method 300 of FIG. 3.

The method includes a start block 802 that passes control to a function block 305. The function block 305 specifies that film grain SEI messages shall be sent preceding I pictures, further specifies that only one film grain SEI message shall precede a particular I picture, and passes control to a function block 310. The function block 310 specifies that film grain SEI messages shall also be sent between two consecutive I pictures, in decoding order, preceding the P or B picture with the smallest POC value, further specifies that only one film grain SEI message shall precede a particular P or B picture, and passes control to a function block 315. The function block 315 specifies that the film grain SEI message preceding a P or B picture shall be the same as the film grain SEI message of the closest I picture that precedes the P or B picture, in decoding order, and passes control to a function block 820. The function block 820 specifies that film grain SEI messages shall be sent preceding P pictures, further specifies that only one film grain SEI message shall precede a particular P picture, and passes control to a function block 825.

The function block 825 specifies that film grain SEI messages shall also be sent between two consecutive P pictures, in decoding order, preceding the B picture with the smallest POC value, further specifies that only one film grain SEI message shall precede a particular B picture, and passes control to an end block 830.

According to the specifications of the method 800 of FIG. 8, film grain simulation can be performed with bit-accuracy in both display order and decode order. Furthermore, bit-accuracy is also achieved between normal playback and trick mode play.

A description will now be given with respect to FIG. 10 regarding a fourth illustrative embodiment in accordance with the principles of the present invention relating to film grain Supplemental Enhancement Information (SEI) message insertion for bit-accurate simulation in a video system.

Figure 10:
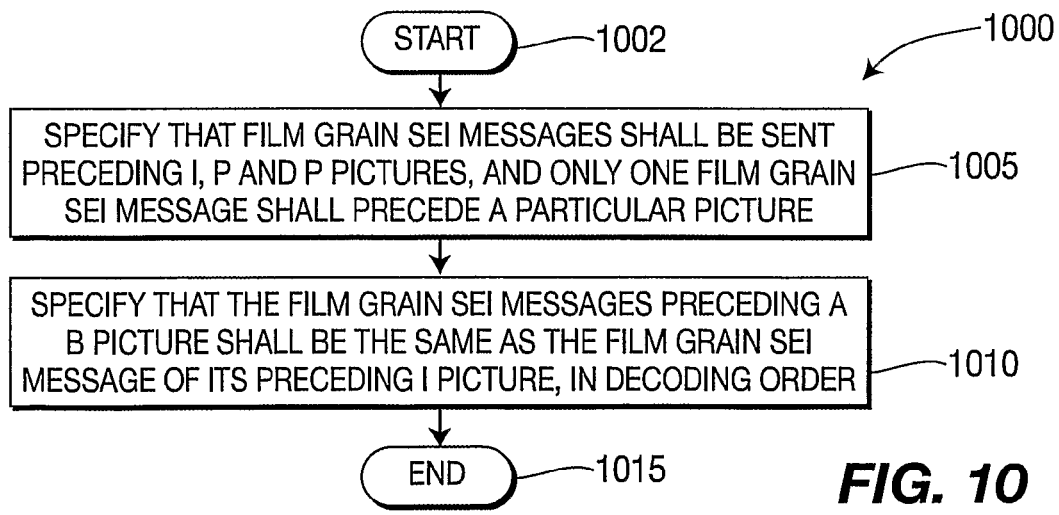
FIG. 10 is a flow diagram illustrating still another method for film grain SEI message insertion for bit-accurate simulation in a video system in accordance with the principles of the present invention.

Turning to FIG. 10, a method for film grain SEI message insertion for bit-accurate simulation in a video system is indicated generally by the reference numeral 1000. The method 1000 of FIG. 10 is derived from the method 800 of FIG. 8 by forcing the insertion a film grain SEI in all B pictures.

The method 1000 includes a start block 1002 that passes control to a function block 1005. The function block 1005 specifies that film grain SEI messages shall be sent preceding I, P and B pictures, further specifies that only one film grain SEI message shall precede a particular picture, and passes control to a function block 1010.

The function block 1010 specifies that the film grain SEI message preceding a B picture shall be the same as the film grain SEI message of its preceding I or P picture, in decoding order, and passes control to an end block 1016.

Turning to FIG. 9, an example of normal playback in accordance with the method 1000 of FIG. 10 is indicated generally by the reference numeral 900. In particular, FIG. 9 shows the differences between film grain simulation in normal playback in decode order 910 and in display order 920, both in accordance with the principles of the present invention.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method for use with a video signal receiving device for simulating film grain in an ordered sequence, comprising the steps of:
receiving at the video signal receiving device film grain supplemental information corresponding to a plurality of intra coded pictures; and
receiving at the video signal receiving device additional film grain supplemental information corresponding to inter coded pictures between consecutive intra coded pictures, in decode order, said inter coded pictures selected based upon display order.

2. The method of claim 1, wherein the display order of the inter coded pictures is determined based on a picture order count (POC) value.

3. The method of claim 1, wherein the POC value is a smallest POC value.

4. The method of claim 1, wherein the film grain supplemental information and the additional film grain supplemental information is included in film grain supplemental enhancement information (SEI) messages.

5. The method of claim 4, wherein only one of the film grain SEI messages corresponds to a particular inter coded picture with a smallest POC value.

6. The method of claim 5, wherein the only one of the film grain SEI messages corresponding to the particular inter coded picture is the same as the film grain SEI message of an intra coded picture that precedes the particular inter coded picture, in decode order.

7. The method of claim 1, wherein the simulating of film grain is bit accurate.

8. The method of claim 7, wherein the simulating of film grain is bit accurate regardless of a play mode used.

9. The method of claim 8, wherein the play mode used is normal mode.

10. The method of claim 8, wherein the play mode used is trick mode.

11. The method of claim 1, wherein the ordered sequence is the display order.

12. An apparatus for providing film grain information to enable simulation of film grain in an ordered sequence, comprising:
means for providing film grain supplemental information corresponding to a plurality of intra coded pictures; and
means for providing additional film grain supplemental information corresponding to inter coded pictures between consecutive intra coded pictures, in decode order, said inter coded pictures selected based upon display order.

13. The apparatus of claim 12, wherein the display order of the inter coded pictures is determined based on a picture order count (POC) value.

14. The apparatus of claim 13, wherein the POC value is a smallest POC value.

15. The apparatus of claim 12, wherein the film grain supplemental information and the additional film grain supplemental information is included in film grain supplemental enhancement information (SEI) messages.

16. The apparatus of claim 15, wherein only one of the film grain SEI messages corresponds to a particular inter coded picture with a smallest POC value.

17. The apparatus of claim 16, wherein the only one of the film grain SEI messages corresponding to the particular inter coded picture is the same as the film grain SEI message of an intra coded picture that precedes the particular inter coded picture, in decode order.

18. The apparatus of claim 12, wherein the simulating of film grain is bit accurate.

19. The apparatus of claim 12, wherein the simulating of film grain is bit accurate regardless of a play mode used.

20. The apparatus of claim 19, wherein the play mode used is normal mode.

21. The apparatus of claim 19, wherein the play mode used is trick mode.

22. The apparatus of claim 12, wherein the ordered sequence is the display order.

\* \* \* \* \*